United States Patent [19]

Ingelstrom

[11] Patent Number: 5,565,156

[45] Date of Patent: Oct. 15, 1996

[54] METHOD OF MAKING A CERAMIC BODY

[75] Inventor: Nils A. Ingelstrom, Bromma, Sweden

[73] Assignee: Sandvik AB, Sandviken, Sweden

[21] Appl. No.: 238,342

[22] Filed: May 5, 1994

Related U.S. Application Data

[63] Continuation of Ser. No. 964,029, Oct. 21, 1992, abandoned.

[30] Foreign Application Priority Data

Oct. 21, 1991 [SE] Sweden .................................. 9103065

[51] Int. Cl.⁶ .......................... C04B 33/32; C04B 37/00
[52] U.S. Cl. .................. 264/60; 264/62; 51/307; 51/309
[58] Field of Search .................. 264/60, 62; 51/307, 51/309

[56] References Cited

U.S. PATENT DOCUMENTS

| | | |
|---|---|---|
| 4,446,100 | 5/1984 | Adlerborn et al. . |
| 4,478,789 | 10/1984 | Adlerborn et al. . |
| 4,505,871 | 3/1985 | Adlerborn et al. . |
| 4,579,703 | 4/1986 | Adlerborn et al. . |
| 4,820,663 | 4/1989 | Mehrutra ................................ 264/60 |
| 4,925,608 | 5/1990 | Rossi ................................... 264/60 |
| 5,049,329 | 9/1991 | Allaire .................................. 264/62 |
| 5,080,843 | 1/1992 | Larker .................................. 264/62 |
| 5,093,056 | 3/1992 | Miyamoto ............................. 264/62 |
| 5,275,633 | 1/1994 | Johansson ............................ 51/309 |
| 5,333,520 | 8/1994 | Fischer ............................... 76/108.2 |

FOREIGN PATENT DOCUMENTS 362594  4/1990  European Pat. Off. .

Primary Examiner—James Derrington
Attorney, Agent, or Firm—Burns, Doane, Swecker & Mathis, L.L.P.

[57] ABSTRACT

There is disclosed a method of making a ceramic body where the body is sintered together from compacted parts to form a body with desired shape. The compacted parts are made of powder with less than 6 weight-% lubricant and the sintering is done by isostatic pressing at elevated temperature at which the body is surrounded by a glass melt.

21 Claims, No Drawings

METHOD OF MAKING A CERAMIC BODY

This application is a continuation of application Ser. No. 07/964,029, filed Oct. 21, 1992, now abandoned.

BACKGROUND OF THE INVENTION

The present invention relates to a method of making a ceramic body for machining tools, rock drilling tools, wear parts, corrosion-resistant articles, heat-resistant parts and bodies for construction purposes. The method is particularly useful for making of ceramic bodies which for some reason, e.g., the outer shape, cannot directly be compacted to final shape by uniaxial pressing.

Ceramic bodies can be produced by injection molding or slip casting followed by sintering. It is also possible to produce ceramic bodies by tool pressing and sintering. As for ceramics as well as for other hard and wear resistant materials, the ultimately desired shape must as far as possible be obtained before the sintering since it is very expensive and, in some cases, not possible to grind to final shape. Grinding must be performed with diamond tools. In certain cases it is not even possible to grind all faces. For ceramic bodies, shaping is preferably made directly to final shape. If shaping of the ceramic body must be performed, it is preferred to do this directly after the forming, e.g., tool pressing or after a presintering which takes place at a temperature at which the ceramic body has a certain strength but has not sintered so much that the strength becomes too high and the shaping that much more difficult. Another method being used for the making of ceramic bodies is cold isostatic pressing followed by sintering. A shaping operation may possibly be applied before the final sintering in order to adjust the dimensions. The method is relatively expensive, however, and not suitable for small parts made in large volumes.

If small parts are to be made in large volumes, tool pressing is often a good method. Many parts then carry the relatively high cost for the pressing tool. Tool pressing of such parts, however, has some limitations. Shapes which are too complex cannot be made according to this method. It is in addition difficult to compact parts with large height/width-ratios and at the same time obtain even density in the whole part. During sintering, the part may shrink unevenly or porosity may be formed in some sections of the body. Porosity and/or cracks may appear if the geometric shape is complex. In certain cases, bodies with complex geometry can be produced using collapsible tools in which the die after the pressing is divided in order to expose the compacted body. Such tools are, however, very expensive and sensitive to the high compacting pressures used when producing ceramics and other hard alloys.

It is known through U.S. Ser. No. 07/425,237, now U.S. Pat. No. 5,275,633 and Ser. No. 07/687,676 (our references 024000-692 and 024000-798, respectively) how to manufacture a cemented carbide body with complex geometry by sintering together the body from simpler parts to a body with desired complex geometry. The sintering is performed usually at atmospheric pressure or lower and the joint is in general not visible and therefore the strength is completely comparable with that of a directly compacted body.

Ceramic materials are often difficult to densely sinter due to the fact that many ceramic systems do not contain any liquid phase during sintering. It is more difficult using solid state sintering to obtain fully dense materials due to the covalent nature of the ceramic bonds in, e.g., $Si_3N_4$. In many cases, additions are made to the ceramic mixture (matrix) to facilitate the sintering, inhibit grain growth, or increase the strength and/or performance, e.g., the addition of MgO to $Al_2O_3$-ceramics.

Addition of needle-shaped single crystals (whiskers) gives particularly good properties to ceramic composites based usually on $Al_2O_3$ or $Si_3N_4$. These crystals are preferably carbides, nitrides, carbonitrides, carboxynitrides and/or oxides of metals with refractory character such as the metals of group IVb (the Ti-group), Vb (the V-group) and VIb (the Cr-group) of the Periodic Table and the metals B and Si. The length to diameter ratio should be more than 5. Also, plate-shaped crystals with a length-width/thickness ratio greater than 5 have been shown to give good properties. Particularly good properties have been obtained with mixtures of needle-shaped and plate-shaped crystals. It has also turned out that materials with particularly good properties can be obtained by mixing in large and small particles, plate- and/or needle-shaped crystals of the above-mentioned type in the ceramics.

It is difficult to sinter composites with additions of needle- or plate-shaped crystals to high relative density, more than 98%, because it is difficult to homogeneously compact powder bodies with such additions. At additions of more than about 10% by volume, special sintering methods have to be applied in order to obtain a good result.

Uniaxial pressure sintering (hot pressing) is such a method where the ceramic can be compacted to high relative density. The method presupposes subsequent machining (cutting, grinding) after the sintering which is expensive and in some cases gives bodies with poor performance.

Ceramic bodies can also be made with so-called glass encapsulated HIPing (HIP means Hot Isostatic Pressing) where the bodies are embedded in molten glass acting as a pressure transmitting medium during sintering as disclosed in, e.g., U.S. Pat. No. 4,446,100. This method is particularly suited for the above-mentioned ceramic composites with larger additions of needle-shaped and/or plate-shaped single crystals. During sintering, the temperature is increased such that the glass begins to soften and forms a tight layer around the bodies. After that, the pressure in the furnace is increased to 50 MPa (Ar, $N_2$, etc., gases are possible to use) or more and the temperature is increased to sintering temperature. Silicon nitrite-based ceramics or ceramic composites can advantageously be made in this way. Alumina-based ceramics or ceramic composites must be protected from influence of the glass and this can be done with the aid of one or more protective layers. In certain cases, an innermost layer is used which serves as a release agent (herein referred to as relief layer). This layer may comprise fine-grained BN.

U.S. Pat. No. 4,579,703 discloses the manufacture of a ceramic body, a turbine wheel of $Si_3N_4$, where is formed at least two parts of which at least one is a shaped powder body formed from powder of a ceramic material mixed with a plasticizer. The individual parts are assembled together into a body of desired shape, the assembled parts are surrounded with a gas-impermeable layer of, e.g., glass. Finally, the assembled parts are HIPped to form a dense, homogeneous body.

OBJECTS AND SUMMARY OF THE INVENTION

It is an object of this invention to provide a method of forming a ceramic body which avoids or alleviates the problems of the prior art.

It is also an object of this invention to provide an efficacious method of forming a highly complex shaped ceramic body without the addition of a plasticizer.

It is also an object of this invention to provide a relatively simple and inexpensive method of manufacturing ceramic metal cutting tools, rock drilling tools, wear parts, heat or corrosion parts or construction bodies.

According to the present invention, there is provided a method of making a ceramic body wherein two or more compacted ceramic parts are assembled to a body with desired shape and sintered, said compacted ceramic parts are made of ceramic powder with <6 weight-% lubricant suitable for tool pressing and the sintering being done by isostatic pressing at elevated temperature at which the assembled body is surrounded by a glass melt and the resulting body.

DETAILED DESCRIPTION OF THE PREFERRED EMBODIMENTS OF THE INVENTION

It has now surprisingly been found that compacted ceramic parts effectively can be joined during sintering by using the features of above-mentioned glass-HIP-method and without the need of a plasticizer. By doing so, bodies with complex geometry and/or different composition can be obtained. The joint is in general not visible and the strength is completely comparable with that of a directly compacted body. In some cases, the joint may be seen in the structure, e.g., because the crystals have a different orientation or somewhat increased porosity. The strength of the joint does not become reduced due to this, however.

It is suitable that the parts are symmetrical. Moreover, it is suitable that the surface of one or more of the parts to be joined be provided with one or more recesses, nobs or grooves which secure the relative positions of the parts during sintering. Alternatively, the parts can be placed in a suitable fixture. Another possibility is to apply some type of 'glue' between the bodies, which disappears during the presintering, or alternatively remains and facilitates the sintering. It is desirable, of course, that the parts are given their final shape already during the pressing, but it is also possible to a certain extent to shape the parts after compaction or presintering.

The idea behind the method of the present invention is to take the two or more compacted (and in certain cases presintered) parts and assemble them. Some of the parts can be completely or partly sintered before assembly. After that, and depending on the ceramic system, the assembled parts are surrounded by a relief layer and one or more protective layers in such a way that no layer is present between the contact surfaces of the parts. This can, e.g., be done by painting, spraying or dipping. After that, the body is placed on a glass powder bed in a graphite crucible and the crucible is filled with glass powder. Organic additions to the powders are evaporated. The crucible is then placed in a HIP-furnace and HIPed.

The invention is applicable for all ceramic systems which do not react with the glass which transmits the pressure (when a protective coating is not used), e.g., $Si_3N_4$-based ceramics and for ceramics where protective layers should be used, e.g., $Al_2O_3$-based ceramics. In both cases a relief layer is suitable. The invention is applicable to ceramics containing needle- and/or plate-shaped single crystals as described above, most particularly $Al_2O_3$-based ceramics. It is also applicable to ceramic composites containing mono- or poly-crystalline particles. The fraction of single crystals or particles is 5–95 volume-%, preferably 5–60 volume-%, and most preferably 10–50 volume-% of the ceramic matrix.

The ceramic powder used to compact the parts is typically standard powder with lubricants suitable for tool pressing of cutting tools, i.e., no plasticizer is needed. Such an addition is generally present when injection molding is used. The amount of lubricant in the powder according to the invention is less than 6 weight-%, preferably 2.5–5 weight-%. The lubricant is evaporated from the parts before embedding in glass powder or at least before the glass has melted forming a tight enclosure.

The invention is furthermore applicable for the manufacture of ceramic compound bodies, preferably of a sandwich-structure, whose various parts consist of material with different composition and/or structure, e.g., ceramics with a tough core and wear resistant surface. In doing so, the core is compacted separately and the surface part(s) separately. In addition, it is possible to adjust the composition of the parts and in that way get a ceramic body which at least on one surface is under compressive stress, which counteracts crack formation, and the underlying part of the ceramic body under tensile stress. This part can suitably be made in a ceramic material which accepts a certain tensile stress without cracking.

If the difference in shrinkage during the sintering of the compound material is too great, one or more cracks may be formed after the glass-HIPing but generally not in the joint. This is in most cases completely pore free and contains no other defects.

An example of a suitable ceramic compound material is a material with a tough core of whisker reinforced (25 to 60 volume-%) alumina ceramics and an outer part of pure alumina with small additions of zirconia (1 to 10 volume-%). Other examples are wear parts made of a tough ceramic such as whisker reinforced alumina composite or zirconium oxide with a wear resistant part of, e.g., alumina. The invention is also applicable for other types of ceramic compound material, e.g., systems where for geometric reasons it is necessary to make compacts which are assembled and sintered. Also parts which for technical compaction reasons (cracks, porosity) are difficult or not possible to make are suitable to produce according to the invention and will be apparent to the skilled artisan.

The compound material can be shaped as a sandwich structure. However, since it by glass-HIP is possible to control the shrinkage, the outer parts can also be shaped, e.g., as a 'hat' which partly or completely covers the clearance faces. The thickness of the outer parts can be from some ten micrometers up to several millimeters and by a subsequent grinding the thickness of the layer can be further reduced.

The method according to the present invention gives the possibility for the manufacture of bodies with layers (compound materials) which can not easily be made with conventional CVD- or PVD-methods.

The invention gives also the possibility for the manufacture of ceramic inserts with chipbreakers formed during the compaction and/or central holes for the clamping and ceramic bodies with inner cavities or channels.

A further application of the method of the present invention is the manufacture of parts designed to maintain or release heat during a longer period of time. This can be accomplished by making compacted .bodies comprising an upper part and a lower part with cavities. These cavities contain crystalline or glassy materials which when heated are subject to a phase transformation which is strongly endothermic. The phase transformation is reversible. During temperature decrease, the reaction is strongly exothermic and releases heat to the surrounding body which in this way can maintain its heat for a long time. The compacted parts and the material which is subject to phase transformation are sintered together to one unit. Conversely, the invention gives the possibility to make cooling bodies.

In certain cases, partial sintering of the ceramic parts can take place so that the surfaces of the parts are sintered dense (gas-impermeable) followed by an increase in sintering gas pressure to obtain a body with an effective joint. Sintering pressures of ≦200 bar may be used in some of these cases. This sintering (as well as the glass HIPing) is conducted using conventional techniques.

What has been said above about ceramics also applies to other systems of the type of titanium-based carbonitride alloys often referred to as cermets, ceramic-metal and other systems difficult to densely sinter in a conventional way.

The invention is additionally illustrated in connection with the following Examples which are to be considered as illustrative of the present invention. It should be understood, however, that the invention is not limited to the specific details of the Examples.

EXAMPLE 1

Powder of $Si_3N_4$ with a mean grain size of 2 μm was milled together with 1 weight-% $Y_2O_3$ and 0.5 weight-% $Al_2O_3$ and 3.0 weight-% polyvinylaclohol dissolved in propanol. After 10 hours milling in a vibrator mill, the slurry was dried on trays in a drying chamber and disintegrated through a 400 μm sieve. The powder was compacted into blanks of type SPGN 120312 (according to ISO). A graphite crucible was painted on the inside with BN mixed in propanol. In the bottom of the crucible, a glass powder (40 weight-% $SiO_2$, 2 weight-% $Al_2O_3$ and 58 weight-% $B_2O_3$) was filled. The blanks were placed in the crucible two to two with the smallest square surfaces against each other. The crucible was subsequently filled with more of the glass powder. The crucible with its contents was heated to 500° C., 1 h in hydrogen in order to evaporate the lubricant and then the temperature was raised to 1000°–1200° C. in argon at atmospheric pressure after which the pressure was raised to 200 MPa and the temperature to 1750° C. which was maintained for one hour. When the furnace had cooled down to about 50° C., it was opened and the crucible with glass and blanks was taken out. The glass was removed by blasting. In this way, an insert was obtained with eight positive edges, which after a slight edge rounding can be used for turning purposes. The obtained body had a joint with a structure not distinguishable from the structure of the other parts of the material.

EXAMPLE 2

A powder mixture consisting of 70 weight-% $Al_2O_3$ and 30 weight-% SiC whiskers was prepared in the same way as described in Example 1. Round plates with diameter of 13 mm and a clearance angle of 7° were compacted of this material. The plates were heat-treated in a combined evaporation and presintering cycle up to a sintering temperature of 1300° C. in a presintering furnace with protective gas. The plates were put together two to two with the smallest circular surfaces against each other. Then a 0.5 mm thick relief layer was sprayed on to the assembled plates after which an equally thick protective layer was painted on. The relief layer was made of BN mixed with propanol and 5% Plexigum P26. The protective layer consisted of a mixture of mullite in methylethylketone with 5% Plexigum P26. The obtained body was put in a crucible with glass powder. The crucible was filled with glass powder. The composition of the glass was 80 weight-% $SiO_2$, 12 weight-% $B_2O_3$, 3 weight-% $Al_2O_3$, 4 weight-% $Na_2O$ and 1 weight-% $K_2O$+CaO. The crucible with its contents was put in a high pressure furnace, binders in the layers were evaporated in vacuum at temperatures between room temperature and 600° C. and the temperature was raised to 1000°–1200° C. at atmospheric pressure in order to melt the glass powder and make it impermeable to the pressure medium (argon). After that the pressure was raised to 160 MPa and the temperature to 1550° C. and these were maintained at these values for one hour. After cooling, the glass and protective layers were removed. The obtained body, a double positive round insert, had an invisible joint.

EXAMPLE 3

Two tubes were made of $Al_2O_3$ powder by cold isostatic compaction having outer diameter 25 mm, inner diameter 20 mm and length 100 mm. Two plates with diameter 25 mm and height 3 mm were compacted by tool pressing. In order to make a bottomed tube, one of the plates was put on top of one of the compacted tubes and was sintered conventionally in air at 1500° C. for one hour. Tube and lid obtained full density but the lid could rather easily be loosened from the tube. In the second case, the lid was put onto the tube and a relief layer and a protective layer were applied. The assembled body was placed in a graphite crucible with glass powder all according to Example 2. After HIPing at 1500° C. for one hour in argon with the pressure 160 MPa, a bottomed tube was obtained with a perfect joint between lid and tube.

EXAMPLE 4

A ceramic compound body was made by compacting two round plates of $Al_2O_3$ powder with a diameter 13 mm and a height 1 mm. In the same compacting tool, a 10 mm high body of $ZrO_2$ powder was compacted. The compacting pressures were adjusted so that the plates had the same sintering shrinkage. The compacted $Al_2O_3$-plates were put on the compacted $ZrO_2$ body in such a way that the two $Al_2O_3$-plates faced the two circular surfaces of the $ZrO_2$ body. A relief layer and a protective layer were painted on the compound body which was HIPed according to the same procedure as disclosed in Example 2. The final sintering temperature was 1480° C. The obtained compound body had a defect free joint without cracks.

EXAMPLE 5

A compound body was made in the same way as in Example 4 with the difference that the compacting pressures were adjusted so that the $ZrO_2$ material shrank approximately 1% more that the $Al_2O_3$ material during the sintering. Also in this case, a defect free joint was obtained.

EXAMPLE 6

A powder mixture of 80 weight-% $Si_3N_4$, 8 weight-% $Y_2O_3$, 6 weight-% $Al_2O_3$ and 6 weight-% AlN was made as in Example 1. Plates were compacted with the dimension 13×13×4 mm. After presintering at 600° C. for one hour in hydrogen, the plates were put together two to two in a graphite crucible on a powder bed of a mixture of BN and $Si_3N_4$ with weight ratio 4:1. In this way, an active powder bed was obtained giving an increased pressure of SiO-gas around the plates which is important to obtain dense sintering and joining. On top of each pair of plates, a piece of sintered Sialon was placed acting as a weight after which the crucible was filled with the powder mixture. The plates were sintered at 1800° C. for one hour in nitrogen at atmospheric pressure. In the obtained bodies, a faintly visible joint could be observed (increased porosity). The Sialon weight could easily be removed from the joined parts.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of making a ceramic cutting tool insert based on alumina or silicon nitride wherein two or more compacted ceramic parts, at least one of which is not sintered or is presintered, the method comprising steps of assembling the parts to form a body with desired shape and sintering the assembled body, said compacted ceramic parts being made of ceramic powder with <6 weight-% lubricant suitable for tool pressing, no layer being placed between the parts before said sintering step and the sintering step being done by isostatic pressing at elevated temperature at which the assembled body is surrounded by a glass melt.

2. The method of claim 1 wherein said compacted ceramic parts have been compacted by tool pressing.

3. The method of claim 1 wherein at least one said part has a different composition and/or structure than another said part, 4. The method of claim 1 wherein at least one part is unsintered prior to assembly.

5. The method of claim I wherein a relief layer and/or at least one protective layer is applied to the assembled parts prior to sintering, 6. The method of claim 1 wherein at least one said part comprises 5–95 volume-% needle-shaped and/or plate-shaped single crystals in a ceramic matrix.

7. The method of claim 6 wherein said matrix is based on alumina.

8. The method of claim 1 wherein said body has such a geometry that it cannot be compacted to final shape by uniaxial compaction.

9. The method of claim 1 wherein said cutting tool is for metal cutting machining, 10. The method of claim 9 wherein said cutting tool insert is provided with chipbreakers and/or central hole for clamping, 11. The method of claim 1 wherein said ceramic powder contains 2.5–5 weight-% lubricant.

12. A method of making a ceramic cutting tool insert based on alumina or silicon nitride wherein two or more tool pressed ceramic parts are assembled to form a body with desired shape and sintered, said tool pressed ceramic parts are made of ceramic powder with <6 weight-% lubricant suitable for tool pressing, and the sintering being done by isostatic pressing at elevated temperature at which the assembled body is surrounded by a glass melt.

13. The method of claim 12 wherein at least one said part has a different composition and/or structure than another said part.

14. The method of claim 12 wherein at least one part is unsintered prior to assembly.

15. The method of claim 12 wherein a relief layer and/or at least one protective layer is applied to the assembled parts prior to sintering.

16. The method of claim 12 wherein at least one said part comprises 5–95 volume-% needle-shaped and/or plate-shaped single crystals in a ceramic matrix.

17. The method of claim 16 wherein said matrix is based on alumina.

18. The method of claim 12 wherein said body has such a geometry that it cannot be compacted to final shape by uniaxial compaction.

19. The method of claim 12 wherein said cutting tool insert is suitable for metal cutting machining.

20. The method of claim 19 wherein said cutting tool insert is provided with chipbreakers and/or central hole for clamping.

21. The method of claim 12 wherein said ceramic powder contains 2.5–5 weight- % lubricant.

\* \* \* \* \*